United States Patent [19]

Romans

[11] 4,204,827
[45] May 27, 1980

[54] INJECTION MOLDING MACHINE
[76] Inventor: Ralph H. Romans, 1621 Roosevelt Rd., Owensboro, Ky. 42301
[21] Appl. No.: 882,608
[22] Filed: Mar. 2, 1978
[51] Int. Cl.$^2$ .............................................. B29F 3/08
[52] U.S. Cl. .................................................. 425/551
[58] Field of Search ......................................... 425/551
[56] References Cited
U.S. PATENT DOCUMENTS
2,461,723   2/1949   Cowan .................................. 425/551

Primary Examiner—Donald J. Arnold
Assistant Examiner—James R. Hall
Attorney, Agent, or Firm—Nathan J. Cornfeld

[57] ABSTRACT

An injection molding machine for thermoplastic and thermosetting materials is provided with air pressure as the sole means other than gravity for moving particulate or powder form of the plastic through the heat cylinder of the machine whereby the plastic power is converted to a viscous molten liquid that is forced through the nozzle of the machine into an orifice of a mold where, after setting, a plastic article can be removed.

3 Claims, 3 Drawing Figures

INJECTION MOLDING MACHINE

BACKGROUND OF THE INVENTION

This invention relates to the art including injection molding machines and apparatus for thermoplastic and thermosetting materials.

Such machines are well known and have heretofore, in the case of machines for thermosetting materials, comprised (1) a feed chute for feeding particulate plastic particles, pellets, or the like from a supply hopper therefor, to (2) a heating cylinder in which the plastic particles are forced through a high temperature zone in the cylinder by means of (3) a plunger, sufficiently high pressure being exerted therein to force the plastic particles through the heat zone to become molten without being appreciably polymerized so that the molten or viscous mass can pass through the orifice of (4) a nozzle and thence into a mold which can be provided with clamps so that the viscous plastic injected thereinto can be contained.

Machines for injection molding thermoplastics are generally similar to those briefly described above for thermosetting materials especially as regards the (1) feed hopper and chute, (2) the heating cylinder, (3) the ram or plunger, and (4) the nozzle. Additionally, thermoplastics are injection molded by machines in which the cylinder is heated by heat bands rather than by heating the nozzle by energization of a low-voltage transformer in order that instant heating of the viscous plastic rather than gradual heating thereof can be accomplished. Also, one often employs a "torpedo", so-called because of its shape, in the cylinder of the machine for molding thermoplastics, the torpedo acting as a spreader to divert the particulate molding powder into narrow, constricted channels where the particles of powder can be more uniformly heated and softened.

As noted above, machines for injection molding of both types of plastic materials employ plungers or rams. Some are hydraulically activated others are mechanically driven. Some machines are known which use reciprocating screws to force under pressure the powder form of plastic through the heated cylinder or nozzle, all of which prior known mechanisms of propulsion being subject to a common disadvantage in that extremely small tolerances of machining are required to produce an efficiently operating machine. All such devices are subject to wear in use whereby the close tolerances are destroyed rendering such machines relatively inefficient or inoperative.

Additionally, the initial cost of manufacture of such plungers, rams, screws and the like is very high as is the replacement cost when the part is worn and can no longer function effectively.

It is therefore a principal object of this invention to provide a machine for injection molding of thermoplastic or thermosetting materials that operates effectively and efficiently without employing a plunger, ram, screw or similar solid means of propelling particulate plastic materials through the heating cylinder of the machine.

Another object of this invention is to provide such an injection molding machine wherein air under pressure constitutes the only means other than gravity for moving particulate plastic material through the heating cylinder of the machine thereby obviating the need for solid means such as rams, plungers or reciprocating screws, for performing this function, thus to eliminate the disadvantages inherent in such solid moving means as plungers, rams and screws.

It is known to use air pressure in the molding of plastics. Such use of air pressure is common in blow molding technology. However, it will be noted that in blow molding, whether it be (1) extrusion or direct blow molding, (2) indirect blow molding either by (a) the so-called tubing method or (b) the two sheet method, or (3) injection blow molding, the employment of air pressure occurs in connection with the parison or hollow plastic member that has preliminarily been formed primarily by an extrusion process in all of which known machines or apparatus plastic powder or particulate material is moved from the feed end adjacent a hopper to and through the heating and melting region by rams, plungers or screws. No reference or suggestion is made in such standard texts as "Exploring the World of Plastics", by Gerald L. Steele, McKnight Publishing Company, Bloomington, Illinois, 1st Edition, 1977, pp. 108-131 or "Modern Plastic Encyclopedia", edited by Joan Agranoff, McGraw Hill Publications Company, New York, N.Y., October 1977, No. 10A, pp. 230-234 to or for the use of air pressure as the motive force to replace rams, plungers or screws in injection molding machines or, indeed, in extrusion apparatus.

SUMMARY OF THE INVENTION

In one embodiment of my invention, air under pressure serves as the sole means other than gravity for forcing particulate or powder form of plastic material from a tank through the heating tube or cylinder of an injection molding machine for thermoplastic or thermosetting materials. The particulate plastic is converted to a consistent viscous molten fluid which under air pressure is forced through the nozzle of the machine into the orifice of a mold where, after solidifying, the plastic article can be removed. In another embodiment of the invention, the above-mentioned tank, instead of being mounted with its axis in a horizontal direction, is mounted with the axis vertical with further advantages to be attained.

BRIEF DESCRIPTION OF THE DRAWING

Further objects and advantages of this invention, as well as its construction, arrangement and operation, will be understood from the following description and claims taken in connection with the accompanying drawing, in which:

FIG. 1 of the drawing, the injection molding machine of this invention is shown as comprising a cylindrical iron or steel tank 11 supported with its axis a-a' in a horizontal position on a suitable stand pipe 13. A source of supply of particulate or powder form of plastic material 15 is connected to tank 11 through a pipe 17 of any convenient diameter, a valve 19 in the pipe 17 being operable to open or close the supply line provided by pipe 17 between the source 15 and the tank 11. The end of pipe 17 is fitted into tank 11 adjacent the right-hand end of tank 11 and there is formed interiorly of the tank a baffle 23 for a purpose which will presently appear.

Figures 1, 2:
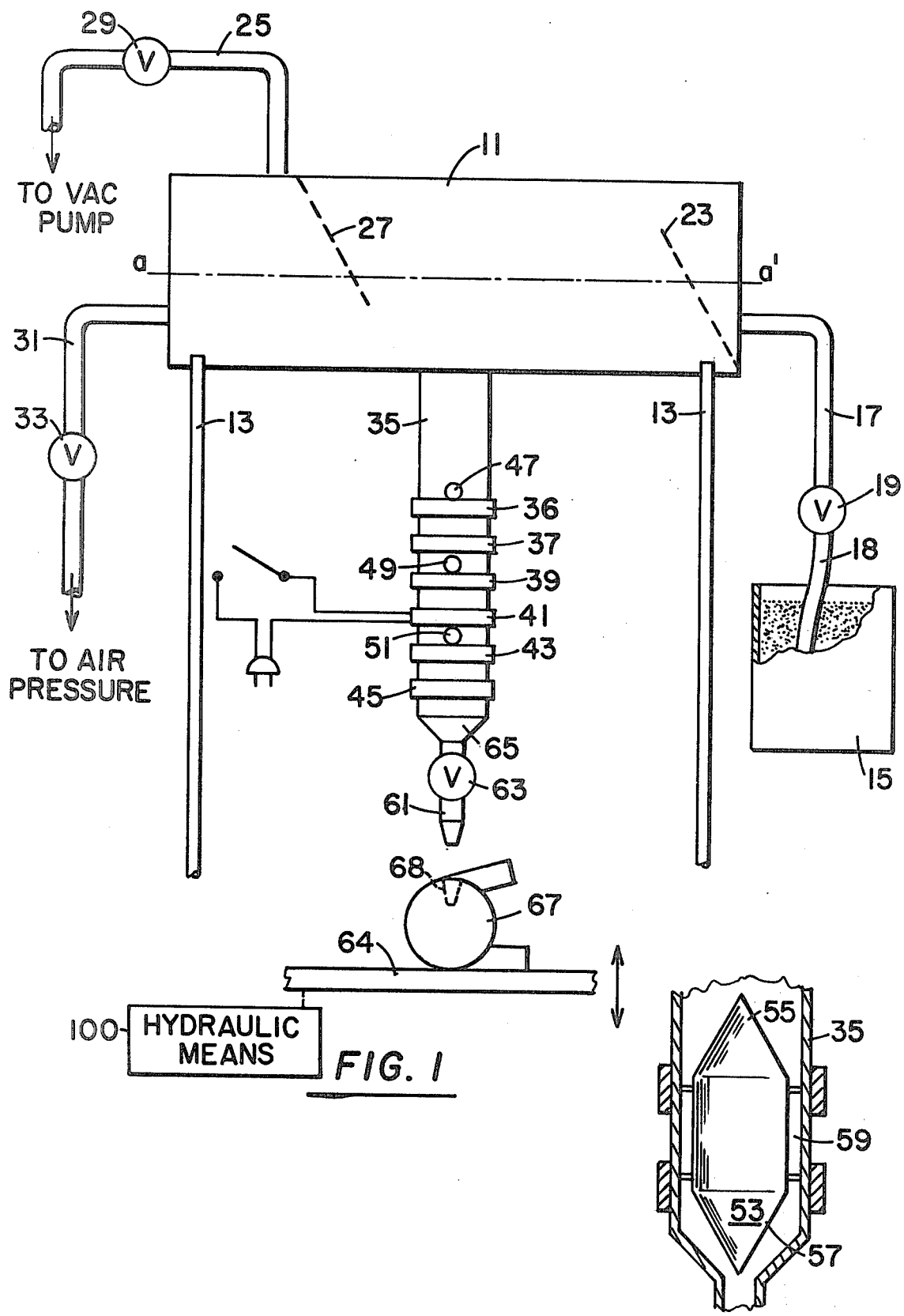
FIG. 1 is a schematic diagram illustrative of an injection molding machine according to this invention.
FIG. 2 is a fragmentary cross-sectional view of a portion of a heater cylinder drawn to an enlarged scale.

At the opposite end of the tank 11 two pipe lines are fitted thereinto one, identified at 25 adjacent the upper portion of the tank and connected to an interiorly disposed baffle 27 is connected through valve 29 to a vacuum pump (not shown). The other pipe line 31 is fitted into the left-hand end of tank 11 and through an air pressure valve 33 to a pump (not shown).

A heating cylinder 35 of iron, steel or other suitable material is shown welded to the side wall of tank 11 and to project vertically downwardly from the tank, the cylinder 35 and tank being in free communication. An array of heat bands, here shown as six in number, bands 36,37,39, 41,43, and 45 are disposed individually to surround the cylinder 35 so that when suitable electric current is passed through heater coils (not shown) in each of the heat bands, the cylinder 35 is heated thereby as would be any particulate plastic material that may be contained within the cylinder. Thermometers 47,49 and 51 can be conveniently supported in spaced array adjacent the heat bands to indicate the temperature to which the cylinder has been elevated upon energization of the heat bands. The electrical circuitry for energizing the heat bands can be as simple as one desires, for example, a 110 volt supply through a single-throw toggle switch for the bands has been found to be entirely satisfactory. Or, if desired, the bands may be interconnected in series-parallel connections, or in any other suitable conventional manner.

Supported in the heating zone of the heating cylinder 35 is a torpedo 53 (FIG. 2) or spreader as it is sometimes called, the torpedo being disposed with its longitudinal axis colinear with that of the cylinder 35. As shown in FIG. 2, the torpedo can be generally cylindrical shape with conical ends 55,57 having respective apices oppositely directed; the diameter of the cylinder of torpedo 53 being slightly smaller than the internal diameter of the heating cylinder, thereby defining a constricted passage 59 between the torpedo and the inner wall of the heating cylinder. By this means, the particulate plastic material and the viscous molten mass is spread in passage downwardly toward a nozzle 61 (FIG. 1) formed at the injection end of the heated cylinder 35 in more uniformly heated fashion. A valve 63, commonly called a sprue valve is located between the nozzle 61 and a tapered end portion 65 of the heater cylinder 35 to meter the quantity of molten plastic that is admitted into the sprue of a conventional two or more part mold form 67 shown in FIG. 1 as resting on an adjustable platen 64.

It will be appreciated by those skilled in the art that the platen 64 can be moved upwardly or downwardly as shown by the double-pointed arrow from the position illustrated by hydraulic or other conventional means 100 (not shown) to position the mold 67 with the sprue hole 68 thereof in immediate engagement with the nozzle 61 to receive the viscous plastic to fill the mold. Metering of the quantity of molten plastic is accomplished by the valve 63 in accordance with known relationship between times of flow, temperature, and pressure on the plastic in the heating cylinder 35.

In operation of the machine of this invention, an air pressure of 60 to 100 pounds per square inch is provided at the pump through line 31, the vacuum pump is arranged to provide suction through line 25 of sufficient magnitude to evacuate the tank 11 upon proper adjustment of valves 19,29, and 33 as will appear herein below, and the source of supply of plastic materials can be a drum of CHEMPLEX 5080 PB polyethylene, for example, into which a piece of flexible hose 18 of suitable length has been placed after being coupled to pipe 17 and valve 19.

Then, with valves 19 and 33 in the supply line and air pressure line, and the sprue valve 63 all closed, the platen 69 is preliminarily in the down position removing the mold from the nozzle 61. The heat bands 36,37, 39,41,43, and 45 are energized by closing the switch so that temperature readings for the indicated plastic powder between 350° F. and 375° F. has been reached and there maintained by any conventional current-limiting means (not shown).

Now, to fill the tank 11 and the heating cylinder 35 with the plastic powder, the air pressure valve 33 is closed, the supply valve 19 and vacuum valve 29 are opened whereupon plastic powder is drawn up from the supply 15, through pipe 17 into tank 11. The baffles 23 and 27 tend to ensure the uniform distribution of the powder in the tank and to prevent powder from being drawn into the vacuum line 25. When it has been determined empirically or by suitable calibration of the machine that the tank and cylinder are full of plastic material for particulate plastic particles and specific suction pressures, the supply and vacuum valves are turned off. It will be understood that gravity will cause plastic powder to fill the heater cylinder 35 and the region of the cylinder 35 surrounded by the heater bands will have attained the melting temperature of the plastic. Thus, a pool of molten, viscous, fluid-like plastic will form in the lower portion of the heater cylinder 35.

At this point in time the platen 64 bearing the mold 67 can be raised to place the filling hole (not shown) of the mold around nozzle 61. Air pressure valve 33 can now be opened admitting air under pressure of about 65 pounds per square inch into the tank, and when sprue valve 63 is opened, molten plastic will flow under pressure to fill the mold.

When the mold has been filled, as determined by any suitable conventional means, as by providing a small opening in the mold through which the molten plastic will seep, the sprue valve 63 is shut off, the platen 64 lowered, the mold removed and cooled and the molded plastic piece removed.

Figure 3:
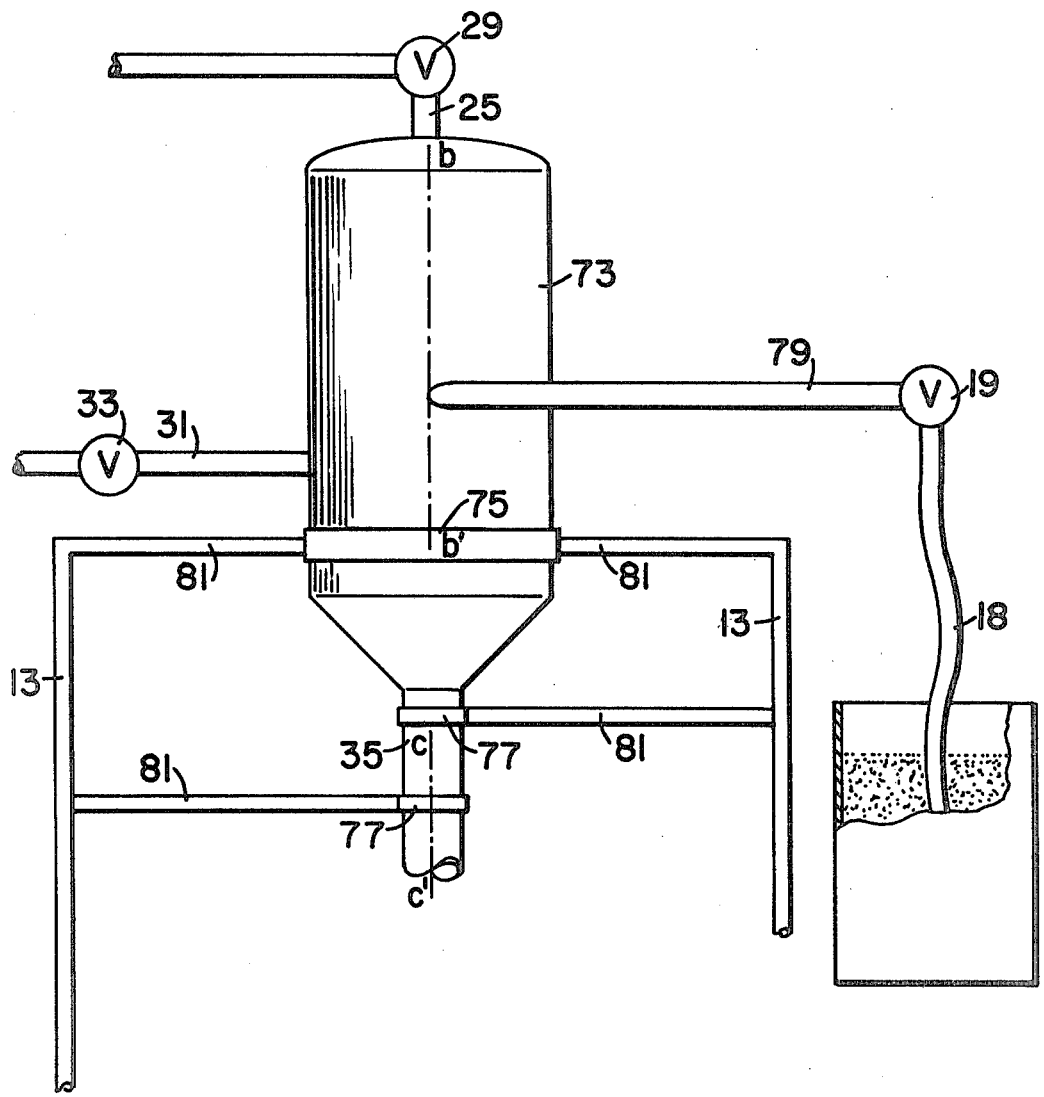
FIG. 3 is a diagrammatic illustration of a modified form of the invention.

FIG. 3 illustrates a modified form of injection molding machine of this invention in which a cylindrical iron tank 73 is supported on the stand pipe 13 with the axis b-b' of the tank in a vertical orientation and preferably colinear with the axis c-c' of the heating cylinder 35. In FIG. 3 parts similar to those of the machine of FIGS. 1 and 2 are identified by corresponding reference numerals.

To support the tank 73 in the vertical position, it is convenient to provide steel bands as at 75 and 77 which can be spot welded at one end to the tank 73 or the heating cylinder 35 and at the other end to the stand pipe 13 by connecting rods 81.

A supply pipe line 79 is connected between tank 73 and the source of particulate plastic material 15 through supply valve 19. Desirably, the pipe should be inserted into the wall of tank 73 tangentally so that when, the particulate material is drawn up into the tank 73, the material will tend to enter the tank in a kind of vortex motion thus ensuring a good spread and distribution of the material inside the tank.

The vacuum pipe line 25 is connected between the vacuum pump (not shown) and tank 73, preferably entering the tank at the upper end thereof, through vacuum valve 29. And, an air input pipe line 31 is connected between the tank 73 and and air pump through air valve 33.

The operation of the embodiment of FIG. 3 is virtually identical to that of the embodiment of FIGS. 1 and 2 so that a repetition of the description of the operation is believed here to be unnecessary.

While the injection molding machine has been described utilizing a polyethylene powder and air pressure useful therewith, it will be understood that the machine can be readily adapted for use with all type of plastic materials whether thermoplastic or thermosetting.

As many changes can be made in the above construction and many apparently widely different embodiments of this invention could be made without departing from the scope thereof, it is intended that all matter contained in the above description or shown in the accompanying drawing shall be interpreted as illustrative and not in a limiting sense.

I claim:

1. An injection molding machine, comprising:
   (a) a supply of particulate plastic material,
   (b) a tank supported in an elevated position relative said supply,
   (c) vacuum means for evacuating said tank and for drawing a predetermined quantity of said material into said tank,
   (d) a hollow heating cylinder connected to a nozzle and in communication with said tank, whereby a portion of said material can pass into said cylinder,
   (e) air pressure means selectively applicable to said particulate material in said tank to force said particulate material through said heating cylinder to transform said particulate material into a molten viscous mass.
   (f) an adjustable platen adapted to support a mold, and
   (g) means to move said platen and said mold thereon into close proximity to said nozzle, the nozzle entering an opening in said mold, whereby said viscous mass is propelled by air pressure to fill said mold.

2. The machine of claim 1 wherein said tank is cylindrical and has an axis orthogonal to that of said heating cylinder.

3. The machine of claim 1 wherein said tank is cylindrical and has an axis colinear with that of said heating cylinder.

* * * * *